UNITED STATES PATENT OFFICE.

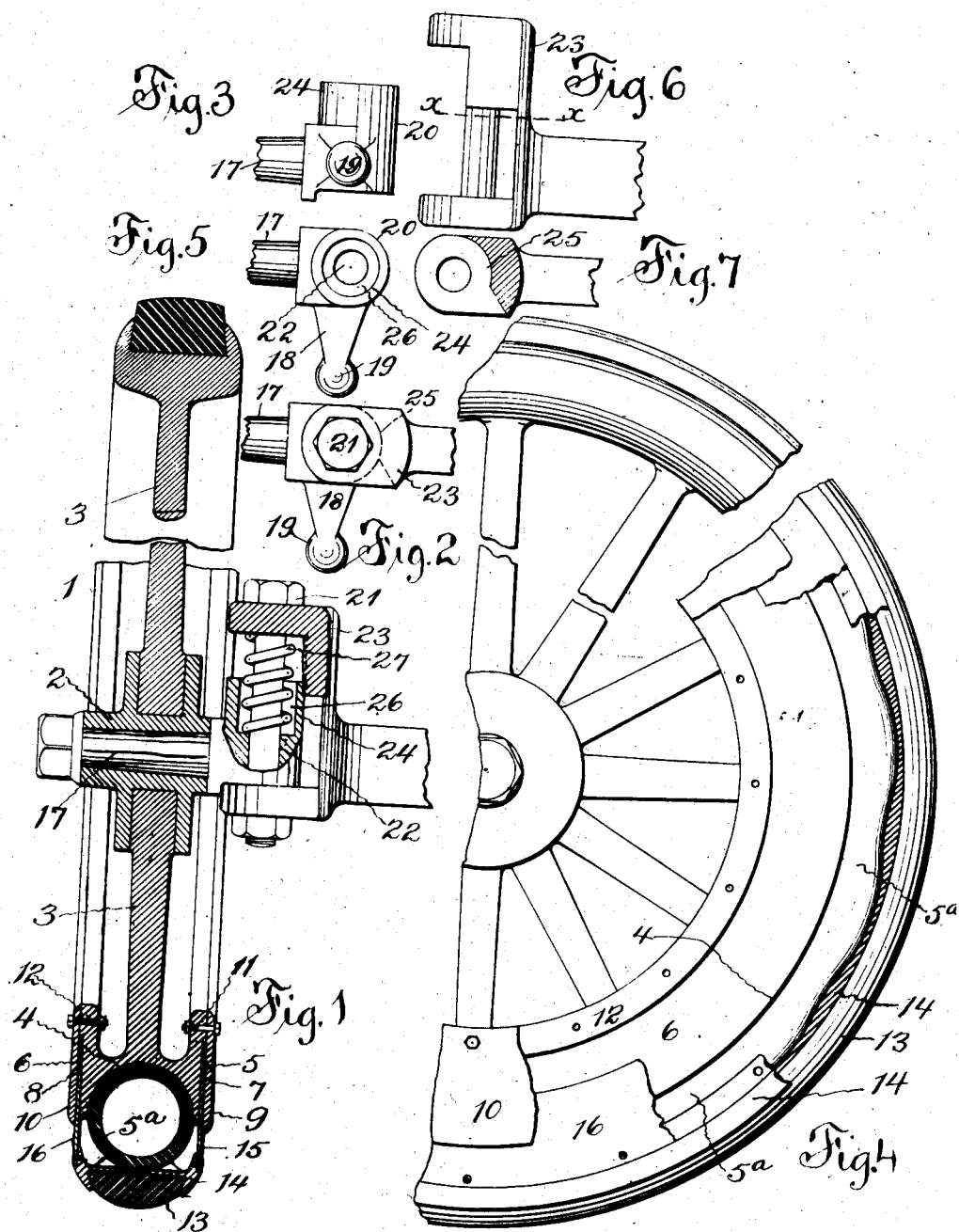

WILLIAM E. SNEDIKER, OF NEW YORK, N. Y.

VEHICLE-WHEEL.

No. 873,907.

Specification of Letters Patent.

Patented Dec. 17, 1907.

Application filed November 1, 1906. Serial No. 341,542.

*To all whom it may concern:*

Be it known that I, WILLIAM E. SNEDIKER, a citizen of the United States, and a resident of New York city, in the county of New York and State of New York, (whose post-office address is 540 West One Hundred and Forty-sixth street, New York city, New York,) have invented certain new and useful Improvements in Vehicle-Wheels, of which the following is a full, clear, and exact description, whereby any one skilled in the art may make and use the same.

The invention relates to vehicle wheels and more particularly to such wheels as are commonly used on trackless vehicles, although its principles of operation may, of course, be embodied in any form of vehicle whether running upon tracks or the open road way.

The objects of the invention are to produce a vehicle wheel or more particularly a shock absorbing device for a wheel which will reduce the jar and vibration ordinarily transmitted from the wheel to the axle and other supported vehicle parts.
A still further object is to secure a shock absorbing effect eliminating at the same time the ordinary difficulties arising from injury to the cushioning or shock absorbing parts.

A still further object is to absorb the shock through a resilient cushion, such as a pneumatic tube, and to provide means for preventing the puncturing of the pneumatic tube.

A still further object is to combine with a pneumatic tube, an auxiliary mechanical absorber, such as a spring.

Referring to the drawings:—Figure 1 is a detail sectional view through a wheel showing the axle and appurtenant parts in elevation. Fig. 2 is a detail plan view of the end of the axle showing a wheel bearing of the pivoted steering type. Fig. 3 is a detail view in side elevation of the wheel pivot. Fig. 4 is a detail side view of a portion of the working tread with parts broken away to show its interior surface. Fig. 5 is a detail plan view of the parts shown in Fig. 3. Fig. 6 is a view in elevation of the end of the axle. Fig. 7 is a sectional view on the line *x—x* of Fig. 6.

It has been common practice to employ on road vehicles, tires of various forms having the capacity to absorb shocks and the commonest type is known as the "pneumatic tire". This form of shock absorber, while having all the requirements of a resilient tread, is, more or less, easily punctured.

It is one of the objects of the present invention to retain all the advantages of resiliency of tire and, at the same time, prevent liability of puncturing. To effect this result, the pneumatic tube or ordinary pneumatic tire is protected by a supplemental tire acting as a direct tread for the wheel. The resultant mechanical effect is to provide what is practically "two wheel rims or treads" between which the pneumatic tire is located in such a manner that while the two wheel treads roll together, there is the effect of one wheel within a second, and with the pneumatic tube always under compression between the two at the tread portion.

To provide a certainty of grip between the two tread portions, the outer or working tread is preferably formed with its inner face undulated This provides a certainty of grip between the outer tread member and the pneumatic tube.

Referring to the drawings, the numeral 1 denotes a wheel which may be of any well-known co struc ion and is, of course, provided with a hub 2 and spokes 3. At the outer end of the spokes is a felly which may be of ordinary type in common practice, or may be of special form as indicated in the drawings.

As shown in Fig. 1, the felly has on its outer face a substantially semi-circular groove or tire-bearing 4, the outer faces 5—6 of which are parallel and are provided with guide-ways 7—8. These guide-ways are actually formed by side-plates 9—10 suitably secured to the outer edges of the felly 11—12 by bolts or other suitable fastening means. Of course, it is understood that there is thus formed an annular guide-groove extending about the entire felly. Within the groove 4 is located a pneumatic tube 5ª which may be of any desired construction and formation and, of course, provided with the necessary air valve for inflating. This valve is not shown in the accompanying drawings.

Extending entirely about the wheel and acting as the actual working tread therefor, is a resilient cushion 13, fastened in a suitable manner to a member 14, the inner surface of which is of undulating form as shown in Fig. 4 of the drawings. These undulations, of course, extend transversely across the inner surface and may be arranged in any given form to meet the exigencies of any particular case.

Bolted or otherwise secured to the tread member 14, are annular disks or plates 15—16 of a proper size and form to fit within the guide-ways 7—8 formed between the sides of the felly and the clamped-on plates 9—10. The inner circumference of these disks 15—16 is such that a deflation of the tire or a partial deflation thereof, such as occurs in common use of the wheel, will permit a sliding movement of the disks within the guide-ways. Their purpose and function is to maintain the working tread in proper relation to the main wheel felly and, at the same time, preclude the ingress of dirt or other materials under the action of which the resilient cushion 5 might deteriorate.

The operation of the device thus far described, pertains particularly to the wheel tread and is, in itself, a shock absorber without reference to the supplemental mechanical absorber hereinafter described. In fact, it would be possible to use this cushion in the form above described, upon any wheel and upon any type of vehicle.

The wheel, above described, is preferably mounted upon a stub axle 17 which, as to its main hub-bearing and pivot, is of ordinary construction and is provided if used as an individual steering-wheel with an offset steering-arm 18, provided with a suitable universal connection 19 to be controlled by a proper form of steering mechanism. This stub axle 17 terminates in a pivot block 20, having a considerable length of bearing upon a wheel pivot 21 which extends through its central opening 22.

The form of the eye at the end of the main axle 23, is also of such a form that the exterior surface 24 of the pivot block, has a running bearing upon its surface as indicated at 25, thus giving an internal and external bearing to the body block and stub axle with reference to the pivot and eye of the main axle.

About the pivot 21 and formed in the pivot block, is a counter-bore or recess 26, within which is located a resilient cushion extending between the pivot block and the upper lip of the eye of the main axle.

As indicated in the drawing, this cushion consists of a spring 27, although, obviously, the cushion might be of any desired form, either of some flexible material, a pneumatic tube or a combination of springs of different forms. Its object and purpose is to give a certain resilience between the main axle 23 and the stub axle which bears the wheel, and to insure the main axle 23 against shock, jar and vibration which may not be absorbed entirely by the resilient tire. It has a further function of relieving to a certain extent the wear and tear upon the tire.

In some type of vehicles it may be found advantageous to use the cushion of the pivot block in conjunction with a solid tire mounted upon the ordinary form of wheel, although, it is preferred to use the pneumatic tread features with the shock absorber of the pivot block.

Obviously the details and the construction of the various parts might be varied to suit the exigencies of any particular demand for construction without departing from the spirit or intent of the invention and various modifications of the arrangement of parts might be made without departing from the invention.

What I claim as my invention and desire to secure by Letters Patent is:—

1. In combination in a wheel having a resilient tread, a stub axle forming the bearing for the wheel, a pivot block appurtenant to said stub axle, an axle eye curved to form an external vertical bearing for the pivot block, a pivot interposed between the axle eye and pivot block and forming the main internal bearing therefor, a recess formed about the pivot of the pivot block, and a resilient cushion arranged in said recess and interposed between the pivot block and axle eye.

2. In combination with a wheel, a stub axle forming a bearing for the wheel, a pivot block appurtenant to said stub axle, an axle eye curved to form a vertical external bearing for the pivot block, a pivot interposed between the axle eye and pivot block and forming an internal bearing therefor and a resilient cushion interposed between the pivot block and axle eye.

WILLIAM E. SNEDIKER.

Witnesses:
    ANNA M. STAPLETON,
    EDWIN S. MERRILL.